United States Patent
Brömster

[11] Patent Number: 6,128,963
[45] Date of Patent: Oct. 10, 2000

[54] GAS FLOW RESTRICTING AND SENSING DEVICE

[75] Inventor: Leif Brömster, Stockholm, Sweden

[73] Assignee: Instrumentarium Corp., Helsinki, Finland

[21] Appl. No.: 09/085,822

[22] Filed: May 28, 1998

[51] Int. Cl.[7] .................................................. G01F 1/37
[52] U.S. Cl. .......................................................... 73/861.52
[58] Field of Search ........................... 73/861.52, 861.42, 73/861.53, 861.54, 861.58, 202, 202.5, 203

[56] References Cited

U.S. PATENT DOCUMENTS

| | | | |
|---|---|---|---|
| 4,403,514 | 9/1983 | Osborn | 73/861.52 |
| 4,418,723 | 12/1983 | Koni et al. | 73/861.52 |
| 4,524,616 | 6/1985 | Drexel et al. | 73/203 |
| 4,702,242 | 10/1987 | Broddner et al. | 128/205.13 |
| 5,044,199 | 9/1991 | Drexel et al. | 73/202 |
| 5,088,332 | 2/1992 | Meriläin et al. | 73/861.65 |
| 5,313,955 | 5/1994 | Rodder | 73/861.52 |
| 5,379,650 | 1/1995 | Kofoed et al. | 73/861.52 |
| 5,445,035 | 8/1995 | Delajoud | 73/861.52 |
| 5,743,253 | 4/1998 | Castor et al. | 128/200.24 |
| 5,750,892 | 5/1998 | Huang et al. | 73/202 |
| 5,804,717 | 9/1998 | Lucas | 73/202 |
| 5,861,546 | 1/1999 | Sagi et al. | 73/861.52 |

*Primary Examiner*—Harshad Patel
*Attorney, Agent, or Firm*—Andrus, Sceales, Starke & Sawall, LLP

[57] ABSTRACT

A flow sensing device for measuring the rate of a gas flow. The flow sensing device includes a flow restrictor having at least one air flow annulus extending between the first and second end of the flow restrictor. Gas entering the flow sensing device at the inlet passes through the airflow annulus and exits the flow sensing device at the outlet. The flow restrictor causes a pressure drop between the inlet and outlet while promoting laminar flow therethrough. By measuring the pressure difference between the inlet and the outlet, the flow rate of the gas can be determined.

8 Claims, 3 Drawing Sheets

GAS FLOW RESTRICTING AND SENSING DEVICE

BACKGROUND OF THE INVENTION

The present invention relates to gas flow measurement, and more specifically to a differential pressure flow meter that is used to determine the flow rate of a gas.

In hospitals, both in intensive care and during operations, it is necessary to perform human respiration artificially using a mechanical ventilator. The unhindered flow of gases to and from the lungs is naturally of vital importance. The functioning of the gas passages can be monitored both by measuring the contents of the inspired gases and by measuring the flows and pressure. Many different technologies have been applied to create a flow meter that meets the requirements of the critical care and operating room environment. Among the flow measurement approaches that have been employed are:

1) Differential pressure—measuring the pressure drop or differential across a resistance to flow.

2) Spinning vane—counting the revolutions of a vane placed in the flow path.

3) Hot wire anemometer—measuring the cooling of a heated wire due to airflow passing around the wire.

4) Ultrasonic Doppler—measuring the frequency shift of an ultrasonic beam as it passes through the flowing gas.

5) Vortex shedding—counting the number of vortices that are shed as the gas flows past a strut placed in the flow stream.

6) Time of flight—measuring the time of an impulse of sound or heat created upstream to a sensor placed downstream At the present time, the most commonly employed device for gas flow measurement in critical care and operating room environments is the differential pressure flow meter. Because the relationship between flow and the pressure drop across a restriction or other resistance to flow is dependent upon the design of the resistance, many different resistance configurations have been proposed. The goal of all these configurations is to achieve a linear relationship between flow and pressure differential. As is well known, flow in a tube can be laminar or turbulent. In the laminar case, the pressure difference across a flow restricting body placed in the path of flow is directly proportional to the rate of flow. For turbulent flow, the pressure difference is a function of the square root of the rate of flow.

In some prior art differential pressure flow meters (commonly termed pneumotachs), the flow restriction has been designed to create a laminar flow that results in a linear relationship between flow and differential pressure. For gas flow rates up to 3 liters/sec, the flow restrictor can be a porous plastic or metal filter 10 with pore sizes on the order of 25 micrometers, as shown in FIGS. 1a and 1b. Another type of flow restrictor includes a bundle of small diameter tubes 12 with appropriate length and diameter to achieve the desired pressure drop, as shown in FIG. 2. In each case, the flow restrictor is designed in an attempt to ensure laminar flow and a linear response to flow.

Therefore, it is an object of the present invention to eliminate the above-identified problems associated with the prior art differential pressure flow meters. Additionally, it is an object of the invention to provide a flow sensing device including a flow restrictor that promotes laminar flow of the gas.

SUMMARY OF THE INVENTION

The present invention is a flow sensing device for measuring the gas flow by measuring the pressure drop across a flow restrictor and calculating the flow rate.

The flow sensing device of the present invention includes a flow restrictor that is positioned between an inlet and an outlet to cause a pressure drop across the restrictor. The flow restrictor includes a solid inner cylinder and a tubular housing positioned to surround the solid inner cylinder. The outer diameter of the inner cylinder is sized slightly smaller than the inner diameter of the tubular housing, such that an airflow annulus is created between the solid inner cylinder and the tubular housing. The airflow annulus allows gas to flow through the flow restrictor between and inlet and an outlet. The flow restrictor including the airflow annulus creates a pressure drop between the inlet and the outlet such that by measuring the pressure drop, the flow rate of the gas can be determined.

In an alternate embodiment, the flow restrictor is constructed including a plurality of concentric airflow annuluses each defining a flow passageway between the inlet and the outlet.

A seal assembly is preferably positioned between the tubular housing and an outer shell to isolate the pressure at the inlet from the pressure at the outlet. A first pressure port is used to determine the pressure at the inlet, and a second pressure port is positioned to measure the pressure at the outlet.

Various other features, objects and advantages of the invention will be made apparent from the following description taken together with the drawings.

BRIEF DESCRIPTION OF THE DRAWINGS

The drawings illustrate the best mode presently contemplated of carrying out the invention.

In the drawings.

DETAILED DESCRIPTION OF THE INVENTION

Figure 1B:
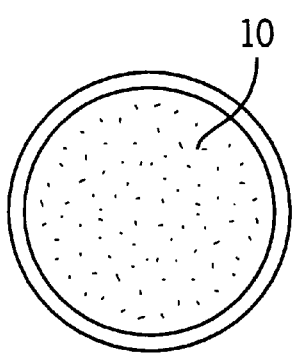
FIGS. 1a and 1b show a prior art flow restrictor that includes a porous restricting membrane.
Figure 1A:
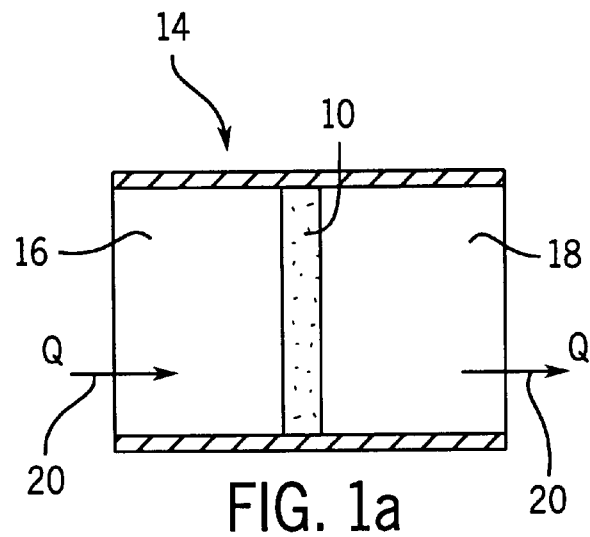

As previously discussed, FIGS. 1a and 1b illustrate a prior art differential pressure flow meter 14 that is commonly referred to as a Fleisch pneumotach. In this prior art differential pressure flow meter 14, the porous metal or plastic filter 10 is positioned between a first end 16 and a second end 18 of the flow meter 14. As the supply of gas flows through the flow meter 14, as shown by arrows 20, the filter 10 causes a drop in pressure such that the pressure at the first end 16 is greater than the pressure at the second end 18. If the gas flow in the meter 14 is laminar, the pressure drop across the filter 10 is proportional to the flow rate Q of the gas.

Figure 2:
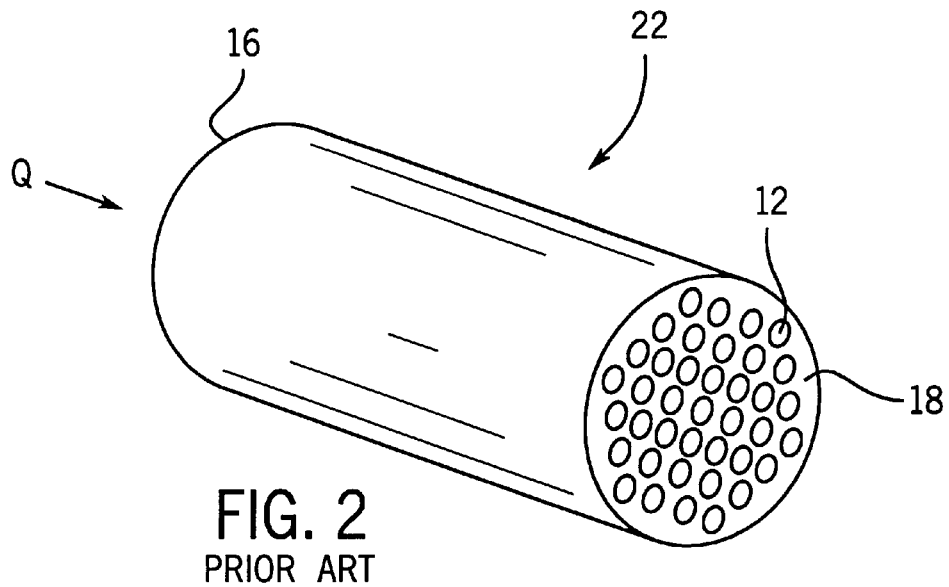
FIG. 2 is a perspective view of a prior art flow restrictor including a plurality of tubes.

FIG. 2 shows a second type of Fleisch pneumotach 22. In the embodiment shown in FIG. 2, a series of small tubes 12 extend between the first end 16 and the second end 18 of the flow meter 22. As the supply of gas flows through the flow meter 22, the series of small tubes 12 create a pressure drop such that the pressure at the first end 16 is greater than the pressure at the second end 18. Again, if the flow of gas through the flow meter 22 is laminar, the flow rate Q is directly proportional to the pressure difference between the first end 16 and the second end 18.

Figure 3:
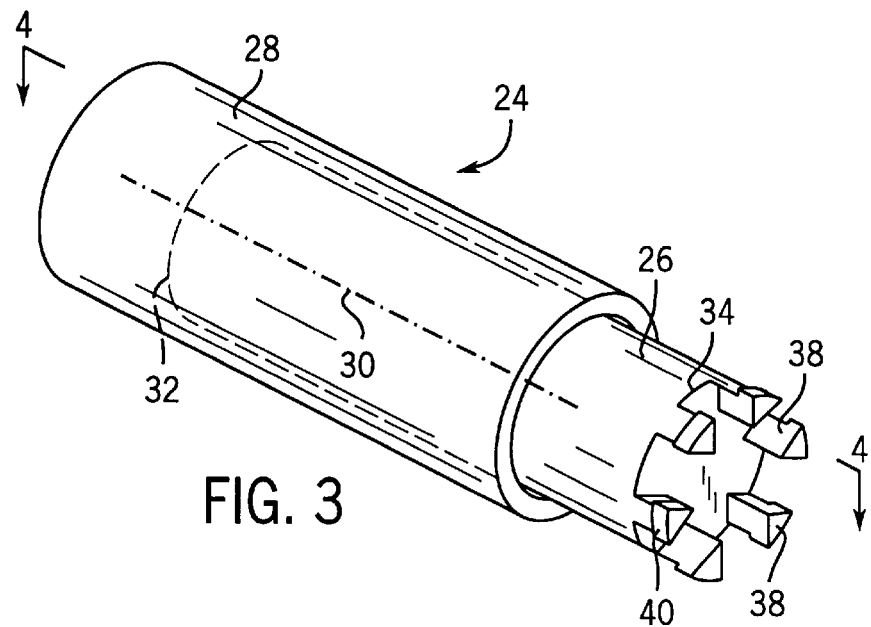
FIG. 3 is a perspective view of the flow restrictor of the present invention.
Figure 4:
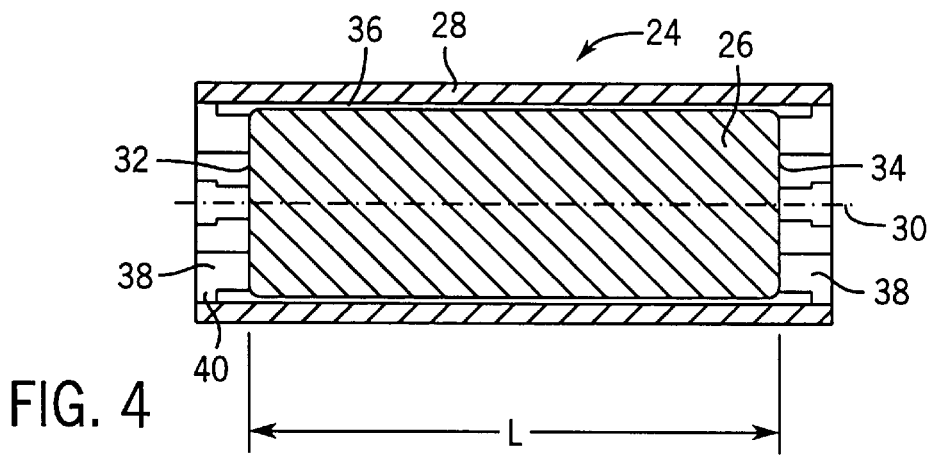
FIG. 4 is a sectional view taken along line 4—4 of FIG. 3.
Figure 5:
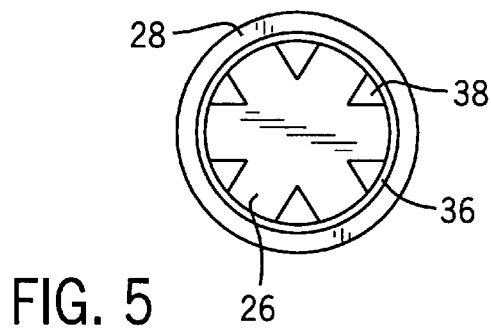
FIG. 5 is an end view of the flow restrictor of the present invention.

The flow sensing device for measuring gas flow in accordance with the present invention is shown in FIGS. 3–5. In the first embodiment of the flow sensing device, a flow restrictor 24 is utilized. The flow restrictor 24 includes an inner cylinder 26 contained within a tubular housing 28. The inner cylinder 26 extends along a longitudinal axis 30 between a first end 32 and a second end 34. In the preferred embodiment of the invention, the inner cylinder 26 is a solid member, as shown in FIG. 4, that has an outer diameter sized slightly smaller than the inner diameter of the hollow interior defined by the tubular housing 28. As can best be seen in FIG. 4, when the inner cylinder 26 is positioned within the tubular housing 28, an air flow annulus 36 is formed between the outer diameter of the inner cylinder 26 and the inner diameter of the tubular housing 28. The air flow annulus 36 is an open area extending between the first end 32 and the second end 34 of the inner cylinder 26, as indicated by length L in FIG. 4. The airflow annulus 36 allows gas to flow axially within the flow restrictor 24 from the first end 32 to the second end 34.

Although the flow restrictor 24 has been described with the gas flowing from the first end 32 to the second end 34, it should be understood that the gas flows in both directions through the flow restrictor 24.

In the flow restrictor 24 of the first embodiment, both the first end 32 and the second end 34 of the inner cylinder 26 include a plurality of support tabs 38 that extend from the ends of the inner cylinder 26. As can best be seen in FIG. 4, the support tabs 38 each include an outer end 40 that contacts the inner diameter of the tubular housing 28 to support the inner cylinder 26 within the tubular housing 28. Since the outer end 40 of each support tab 38 extends further from the longitudinal axis 30 than the outer diameter of the inner cylinder 26, the support tabs 38 provide separation between the inner cylinder 26 and the tubular housing 28 to create the air flow annulus 36.

In the flow restrictor 24, as gas flows through the airflow annulus 36 from the first end 32 to the second end 34, the pressure of the gas drops due to the flow restrictor 24. The shape of the airflow annulus 36 promotes laminar flow, such that the pressure drop across the flow restrictor 245 is directly proportional to the gas flow rate. In the embodiment of the invention shown in the Figures, the length L of the airflow annulus 36 is approximately 25 mm, while the height of the airflow annulus 36, which is determined by the difference in the diameters of the inner cylinder 26 and the tubular housing 28, is approximately 2×0.35 mm=0.70 mm. Thus, the length-to-height ratio for the airflow annulus 36 in the preferred embodiment is approximately 36. According to the present invention, the height of the airflow annulus 36 should be smaller than its length L. In the preferred embodiment of the invention, the length-to-height ratio should exceed 20, and in many cases a ratio exceeding 100 may be desired.

Figure 7:
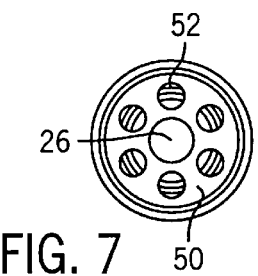
FIG. 7 is an end view of the flow sensing device including a second embodiment of the flow restrictor of the present invention.
Figure 6:
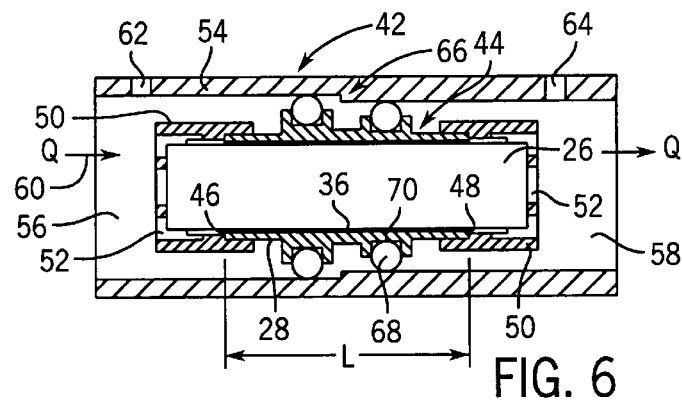
FIG. 6 is a sectional view of a flow sensing device including a second embodiment of the flow restrictor of the present invention.

Referring now to FIGS. 6 and 7, thereshown is a flow sensing device 42 incorporating a flow restrictor 44 of the second embodiment. As in the first embodiment, the flow restrictor 44 includes the inner cylinder 26 and the tubular housing 28. The air flow annulus 36 extends between a first end 46 and a second end 48 of the tubular housing 28, and has a length L shown in FIG. 6. Unlike the first embodiment shown in FIGS. 3–5, the flow restrictor 44 of the second embodiment includes a pair of end caps 50 that receive and retain both the inner cylinder 26 and the tubular housing 28. The end caps 50 provide the required spacing between the outer diameter of the inner cylinder 26 and the inner diameter of the tubular housing 28 to create the air flow annulus 36. Each of the end caps 50 includes a plurality of openings 52 that permit the flow of gas therethrough, such that the gas can flow through the end cap 50 and into the air flow annulus 36.

In the flow sensing device 42, an outer shell 54 surrounds the flow restrictor 44 and includes an inlet opening 56 and outlet opening 58. Although the outer shell 54 is shown as having an inlet 56 and an outlet 58, it should be understood that the flow of gas represented by arrow 60 could flow in either direction. In the preferred embodiment of the invention, the inlet 56 is coupled to a supply of fresh gas, while the outlet 58 is coupled to the patient respiration tube.

The outer shell 54 includes a first pressure port 62 and a second pressure port 64 that are each connected to a conventional pressure measuring device. The first pressure port 62 is used to measure the pressure at the inlet 56, while the second pressure port 64 is used to measure the pressure at the outlet 58. Since the shape of the airflow annulus 36 promotes laminar gas flow, the difference in the gas pressure at the inlet 56 and the outlet 58 can be used to determine the gas flow rate Q.

A sealing assembly 66 is used to isolate the pressure at the inlet 56 from the pressure at the outlet 58, such that a pressure difference can develop between the inlet 56 and the outlet 58 due to the flow restrictor 44. In the preferred embodiment of the invention, a pair of resilient O-rings 68 are positioned between the outer diameter of the tubular housing 28 and the inner diameter of the outer shell 54. Each of the O-rings 68 are retained in a channel 70 formed in the tubular housing 28.

Figure 9:
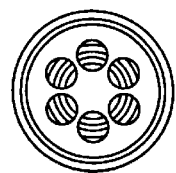
FIG. 9 is an end view of the flow restrictor shown in FIG. 8.
Figure 8:
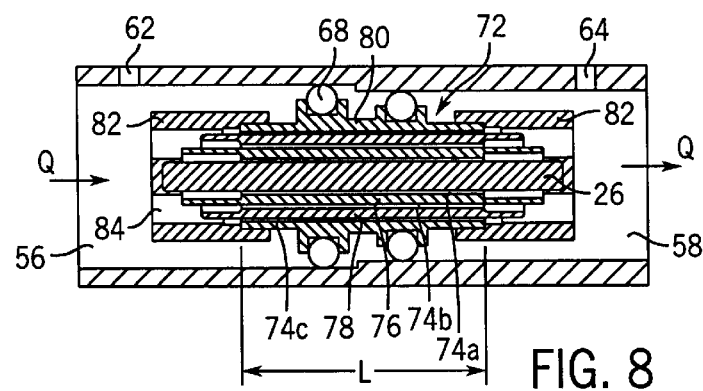
FIG. 8 is a sectional view of a flow sensing device including a third embodiment of the flow restrictor of the present invention.

Referring now to FIGS. 8 and 9, a flow restrictor 72 of a third embodiment is thereshown. As best seen in FIG. 8, the flow restrictor 72 includes a plurality of concentric airflow annuluses 74a, 74b, and 74c. The first airflow annulus 74a is defined between the outer diameter of the inner cylinder 26 and a first tubular housing 76. The second airflow annulus 74b is defined between the outer diameter of the first tubular housing 76 and the inner diameter of a second tubular housing 78. Finally, the third airflow annulus 74c is defined between the outer diameter of the second tubular housing 78 and the inner diameter of a third tubular housing 80. A pair of end caps 82 supports each of the tubular housings 76–80 and the inner cylinder 26 in a spaced arrangement. End caps 82 each include a series of openings 84 that allow the respiratory gas to flow from the inlet 56 to the outlet 58 through the plurality of air flow annuluses 74a–c. As with the second embodiment shown in FIGS. 6 and 7, the third embodiment shown in FIG. 8 includes a pair of O-rings 68 that provide a seal to isolate the pressures contained at the inlet 56 and the outlet 58, such that the first pressure port 62 and the second pressure port 64 can measure the pressure difference between the inlet 56 and outlet 58. As was previously discussed, the pressure difference between the inlet 56 and the outlet 58 can be used to determine the flow rate of gas passing through the flow restrictor 72.

Figure 10:
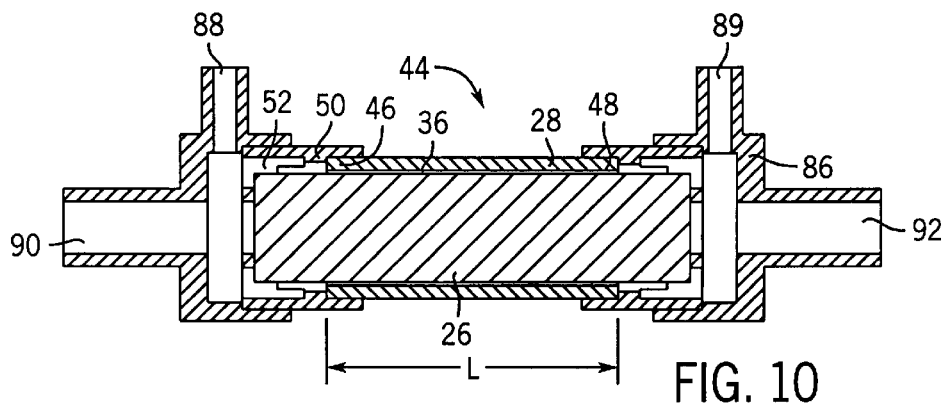
FIG. 10 is a sectional view of a flow sensing device including a fourth embodiment of the flow restrictor of the present invention.

Referring now to FIG. 10, the flow restrictor 44 is shown as including a pair of connectors 86 that can be used for both the inlet and outlet flow of gas and pressure measurement. The connectors 86 each include a pressure port 88 or 89 and either an inlet 90 or an outlet 92. Gas entering through the inlet 90 flows through the openings 52 in the end cap 50 and into the air flow annulus 36 defined between the tubular housing 28 and the solid inner cylinder 26. The airflow annulus 36 extends along a length L between the first end 46 and the second end 48 of the tubular housing 36. After passing through the airflow annulus 36, the flow of gas is measured by the second pressure port 89 and exits the outlet 92.

Although the present invention has been shown and described as including a solid inner cylinder 26, it is contemplated by the inventor that the inner cylinder 26 could include an axial tube with substantially the same height as the airflow annulus centered in the inner cylinder 26 and extending along the length of the cylinder. The axial tube would thus permit the flow of gas along the longitudinal axis 30 through the center of the inner cylinder 26.

In each of the embodiments discussed above, a linear relationship between the flow rate and the pressure drop is seen since the small gap between the solid inner cylinder and the tubular housing makes the flow of respiratory gas laminar over the measuring range L. Additionally, the relatively large circumference of the airflow annulus allows the total pressure drop between the inlet 56 and the outlet 58 to be relatively low.

Various alternatives and embodiments are contemplated as being within the scope of the following claims particularly pointing out and distinctly claiming the subject matter regarded as the invention.

What is claimed is:

1. A flow sensing device for measuring gas flow, the sensing device comprising:
   an inner cylinder extending along a longitudinal axis between a first end and a second end, the inner cylinder having an outer surface having an outer diameter and spaced radially from the longitudinal axis;
   a tubular housing positioned to surround the inner cylinder, the tubular housing having a hollow interior extending along the longitudinal axis between opposed first and second ends, the hollow interior being defined by an inner surface having an inner diameter and spaced radially from the longitudinal axis, the inner diameter of the tubular housing being larger than the outer diameter of the outer surface of the inner cylinder;
   a pair of end caps positioned to engage and support the first and second ends of both the inner cylinder and the tubular housing, each end cap including a plurality of spaced support tabs that contact the outer surface of the inner cylinder and each end cap frictionally engaging an outer surface of the tubular housing to suspend the inner cylinder within the tubular housing such that the difference between the outer diameter of the inner cylinder and the inner diameter of the tubular housing defines an airflow annulus extending along the length of the tubular housing to permit gas to flow through the airflow annulus;
   an outer shell positioned around the tubular housing to receive the gas flow and direct the gas flow through the airflow annulus, the tubular housing being mounted within the outer shell by a seal assembly that isolates the gas pressures at the first and second ends of the tubular housing from each other;
   a first pressure port formed in the outer shell to measure the pressure of the gas flow at the first end of the tubular housing prior to the gas flow entering into the airflow annulus; and
   a second pressure port formed in the outer shell to measure the pressure of the gas flow at the second end of the tubular housing after the gas flow exits the airflow annulus.

2. The flow sensing device of claim 1 wherein the tubular housing further includes a plurality of concentric airflow annuluses each extending between the first and second ends of the tubular housing, the plurality of airflow annuluses being set off from each other by a plurality of spaced support tabs, the airflow annuluses permitting the flow of gas between the first end and the second end of the tubular housing.

3. The flow sensing device of claim 1 wherein each of the end caps includes a series of opening to permit the flow of gas through the end cap and into the airflow annulus.

4. The flow sensing device of claim 1 wherein each of the end caps are contained within a hollow open interior defined by the outer shell.

5. The flow sensing device of claim 1 wherein the seal assembly includes a pair of resilient O-rings positioned between the tubular housing and the outer shell.

6. A flow sensing device for measuring gas flow, the sensing device comprising:
   an inner cylinder extending along a longitudinal axis between a first end and a second end, the inner cylinder having an outer surface having an outer diameter and spaced radially from the longitudinal axis;
   a first tubular housing positioned to surround the inner cylinder, the first tubular housing extending along the longitudinal axis between opposed first and second ends, the first tubular housing defined by an inner surface having an inner diameter and an outer surface having an outer diameter, the inner diameter of the first tubular housing being larger than the outer diameter of the inner cylinder;
   a second tubular housing positioned to surround the first tubular housing, the second tubular housing extending along the longitudinal axis between opposed first and second ends, the second tubular housing defined by an inner surface having an inner diameter and an outer surface having an outer diameter, the inner diameter of the second tubular housing being larger than the outer diameter of first tubular housing;
   a pair of end caps positioned to engage and support the first and second ends of the first tubular housing, the second tubular housing and the inner cylinder, each end cap engaging the outer surface of the inner cylinder, the outer surface of the first tubular housing, and the outer surface of the second tubular housing to suspend the inner cylinder within the first tubular housing and to suspend the first tubular housing within the second tubular housing such that the difference between the outer diameter of the inner cylinder and the inner diameter of the first tubular housing defines a first airflow annulus and the difference between the outer diameter of the first tubular housing and the inner diameter of the second tubular housing defines a second airflow annulus;

an outer shell positioned around the second tubular housing to receive the gas flow and direct the gas flow through the first and second airflow annuluses;

a seal assembly positioned between the second tubular housing and the outer shell to isolate the gas pressures at the first and second ends of the second tubular housing from each other;

a first pressure port formed in the outer shell to measure the pressure of the gas flow at the first end of the tubular housing prior to the gas flow entering into the first airflow annulus and second airflow annulus; and a second pressure port formed in the outer shell to measure the pressure of the gas flow at the second end of the tubular housing after the gas flow exits the first airflow annulus and second airflow annulus.

7. The flow sensing device of claim 6 wherein the first airflow annulus and the second airflow annulus are concentric.

8. The flow sensing device of claim 6 wherein each of the end caps includes a series of openings to permit the flow of gas through the end cap and into the first airflow annulus and the second airflow annulus.

* * * * *